United States Patent [19]

Figge, Sr.

[11] Patent Number: 5,124,196

[45] Date of Patent: Jun. 23, 1992

[54] PRESTRESSED ARTICLE AND METHOD

[75] Inventor: Irving E. Figge, Sr., Manassas, Va.

[73] Assignee: Atlantic Research Corporation, Alex., Va.

[21] Appl. No.: 704,102

[22] Filed: May 22, 1991

Related U.S. Application Data

[62] Division of Ser. No. 641,706, Jan. 15, 1991.

[51] Int. Cl.$^5$ ............... B32B 7/00; D03D 3/00; D04B 1/00; D04H 1/00
[52] U.S. Cl. .................. 428/246; 428/224; 428/226; 428/251; 428/252; 428/268; 428/273; 428/408; 428/902
[58] Field of Search ............... 156/212; 428/246, 251, 428/252, 268, 773, 408

[56] References Cited

U.S. PATENT DOCUMENTS 4,194,938  3/1980  Figge et al. ................ 156/212

*Primary Examiner*—Patrick J. Ryan
*Assistant Examiner*—Richard C. Weisberger
*Attorney, Agent, or Firm*—Laubscher, Presta & Laubscher

[57] ABSTRACT

A prestressed thermoformed panel, comprising an inner thermoplastic layer having fine grooves on the outer surfaces thereof, and outer fiber-reinforced thermosetting layers bonded to the outer surfaces of the inner layer. The grooves of the inner layer are of a size, pattern and orientation similar to that of the fibers of the thermosetting materials so that at least some of the fibers are positioned in the grooves to enhance the strength of the panel. In the method of forming the panel, the inner and outer layers are heated to approximately the fusion temperature of the thermoplastic material while applying inward pressure on the outer layers in the direction of the inner layer to bond them thereto. The pressure is less than the extruding pressure of the thermoplastic material. Thereafter, the thermosetting outer layers are cured, and the inward pressure on the outer layers is maintained until the temperature is at least 50° F. below the fusion temperature of the thermoplastic material. In this manner, a prestressed flat laminated panel is formed. If it is desired to form a curved panel, the flat panel is heated to the forming temperature of the thermoplastic matrial and is then deformed to a curved configuration by inward pressure from mating curved die members or the like on opposite sides thereof.

4 Claims, 1 Drawing Sheet

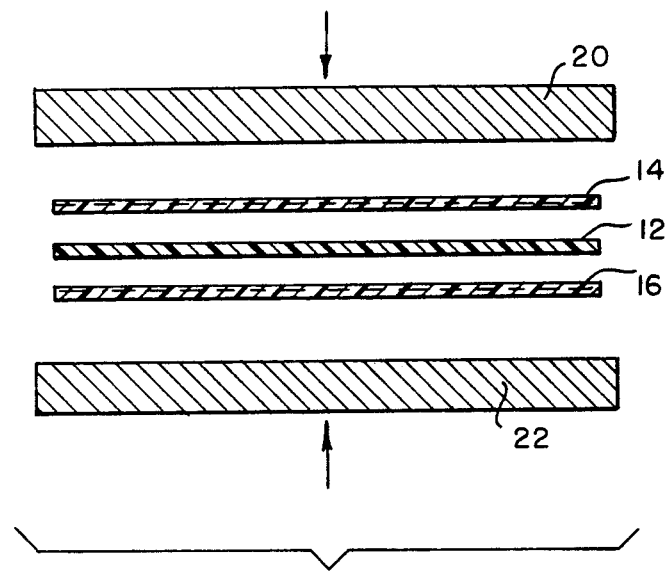
FIG. 1
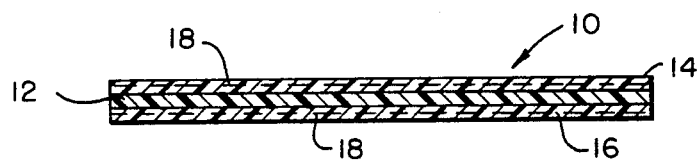
FIG. 2
FIG. 3
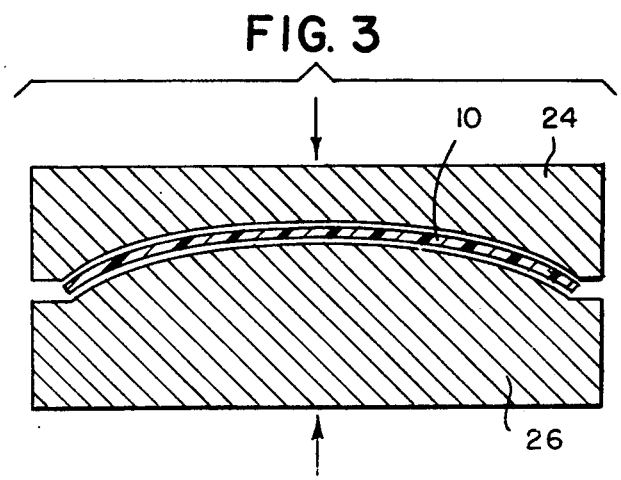

PRESTRESSED ARTICLE AND METHOD

This application is a division of application Ser. No. 07/641,706, filed Jan. 15, 1991.

BACKGROUND OF THE INVENTION

This invention relates a process for fabricating and thermoforming prestressed plastic articles, and to articles made by the process.

In thermoforming, a sheet of thermoplastic resin is clamped into a clamp frame and heated. An oven or heat station is utilized, which heats the edges as well as the center of the thermoplastic sheet so that, when it is subsequently delivered to a forming station, an overall temperature balance has been attained. After heating, the sheet is conveyed to the forming station where by one of several methods, it is forced over a mold. In any thermoforming operation residual heat of the plastic must be removed as quickly as possible after forming. After cooling the end product is removed from the forming station and sent to a trim press where it :s trimmed from the web.

It can be seen that the thermoforming operation is utilized for making articles from sheets of thermoplastic resins, for example, acrylics (acrylonitrile polymers), polycarbonates, polyesters, polyimides, polypropylene, polystyrene and polyvinyl alcohol. One of the disadvantages of the process is that, using thermoplastic resins, it is not always possible to obtain the strength properties desired. As an example, thermoforming has been attempted for bodies of certain airborne objects. However it was found that such bodies readily cracked on landing. In accordance with the practice of this invention a thermoforming process has been developed which leads not only to plastic articles having better strength properties, but to prestressed plastic articles.

U.S. Pat. Nos. 4,194,938; 4,201,612; and 4,230,764 disclose methods for forming prestressed plastic articles by thermoforming, wherein a sheet of a thermoplastic resin is forced over a mold, the methods including heating a thermoplastic sheet and a thermosettinq resin-impregnated sheet of fiber-reinforced weft under conditions such that the thermoplastic layer would normally follow the mold, superimposing the soft thermoplastic sheet on the thermosetting resin layer, forcing the thermoplastic layer and thereby the thermosetting layer throughout the mold to put the thermosetting layer under tension, cooling the thermoplastic layer during the curing of the thermosetting layer to also put the thermoplastic layer under tension, and curing the thermosetting resin while both layers are under tension to form the prestressed plastic article.

While the methods of these patents have satisfactorily produced prestressed plastic articles, it has not been possible to consistently produce flat panels or shaped panels of a predetermined curvature with the use of these methods or article constructions. Accordingly, a need has arisen for a prestressed plastic article construction and method that can produce such articles in a flat configuration or in a predetermined curved or shaped configuration. The article and method of the present invention meet this need.

SUMMARY OF THE INVENTION

In accordance with the present invention, prestressed flat panels can be consistently produced having a thermoplastic material core with fiber reinforced thermosetting face sheets on both sides thereof. If desired, the flat panels can then be post-formed into panels having predetermined simple or complex curvature.

As a first step, the opposite surfaces of the thermoplastic core or sheet are provided with grooves therein to enhance the bond between the thermoplastic core and the fiber-reinforced thermosetting face sheets. If the fibers in the thermosetting face sheets are unidirectional, the grooves are formed in the thermoplastic core in generally parallel alignment extending in the same direction as the fibers. If the fibers are in a random pattern in the thermosetting face sheets, the grooves are provided in the opposite surfaces of the thermoplastic core in a similar random pattern so that at least some of the fibers will be positioned in the grooves. Preferably, the fibers and grooves on both sides of the thermoplastic core are of the same pattern to provide a "balanced" laminate of fiber-reinforced thermosets on both sides of the thermoplastic core.

The balanced laminate then is placed in a press where both sides thereof are heated to the fusion temperature of the thermoplastic core and subjected to a pressure of less than the extruding pressure of the thermoplastic material of the core. Generally, the pressure will be approximately 20-50 p.s.i. and the laminate is cured in accordance with the manufacturer's specification for the thermosetting material. Pressure is maintained during cool-down until the temperature is at least 50° F. below the fusion temperature of the thermoplastic core. This process will consistently produce prestressed panels in a flat configuration.

The prestressed flat panels can then be post-formed into simple or complex curved shapes by placing them in matched tooling or dies having the desired curved shape and heated to the forming temperature of the thermoplastic material. The flat panels are preheated to the forming temperature of the thermoplastic core before the tooling or dies are closed. The curved panel is then allowed to cool down to at least 50° F. below the forming temperature of the thermoplastic core before the tooling or dies are opened.

With the use of this new and improved method, the curved panel retains its desired shape, is prestressed because of residual compressive stresses and possesses greater strength properties than other thermoformed plastic articles.

BRIEF DESCRIPTION OF THE DRAWINGS

FIG. 1 is an elevational view in section and in schematic and exploded form showing the thermoplastic core layer and the surrounding fiber-reinforced thermosetting face sheets of the subject panel positioned between the clamping members of a press before the application of heat and pressure thereto;

FIG. 2 is an elevational view in section of a prestressed flat panel formed in accordance with the method of the present invention; and FIG. 3 is an elevational view in section of the prestressed flat panel of FIG. 2 positioned between matched die members or the like for post-forming into a desired curved configuration.

DESCRIPTION OF THE PREFERRED EMBODIMENTS

Referring to FIG. 2, the prestressed plastic article 10 of the present invention is shown in a flat configuration and comprises an inner layer or core 12 of a suitable thermoplastic material and surrounding outer layers 14 and 16 of a suitable fiber reinforced thermosetting material bonded to the inner layer 12. The reinforcing fibers 18 in the thermoset layers 14, 16 preferably are arranged in the same pattern and orientation, and the outer surfaces of the inner layer 12 are provided with a plurality of grooves (not shown) therein in which at least some of the reinforcing fibers are positioned to enhance the bond between the inner layer 12 and the outer layers 14, 16. The grooves in the outer surfaces of the inner layer 12 preferably are of a size and a pattern or orientation the same as or similar to that of the fibers 18 in the outer layers 14, 16.

As an illustrative example, the inner layer 12 may be formed of thermoplastic materials such as styrene, acrylonitrile butadine styrene or cellulose acetate butyrate. The outer layers 14, 16 may be formed of wet or partially cured epoxies or polyesters in combination with unidirectional fibers or reinforcing cloth wherein the fibers are oriented in a random pattern. The fibers 18 may be formed of fiberglass, KEVLAR ® or graphite.

In accordance with the method of forming the prestressed plastic article of the present invention, the opposite or outer faces of the thermoplastic inner layer 12 are provided with fine grooves (not shown) therein by grinding or the like. These grooves are of a size, pattern and orientation similar to that of the fibers 18 in the thermosetting outer layers 14, 16 to be bonded to the inner layer 12. If the fibers 18 are unidirectional, the grooves are formed in generally parallel alignment extending in the same direction as the fibers. If the fibers 18 are in a random pattern, the grooves are formed in a similar random pattern.

As shown in FIG. 1, the inner thermoplastic layer 12 and surrounding fiber-reinforced thermosetting layers 14, 16 are then placed in a press between clamping members 20, 22 thereof. The outer thermosetting layers 14, 16 preferably are of the same materials and have the same type of fiber reinforcement to provide a "balanced" laminate with the inner thermoplastic layer 12. The layers 12, 14 and 16 may be of any suitable relative thicknesses, e.g., the inner layer 12 may be approximately 0.10 inches thick and each of the outer layers 14, 16 may be approximately 0.01 inches thick.

The clamping members 20, 22 are heated to the fusion temperature of the thermoplastic inner layer 12 and are moved inwardly in the direction of the arrows in FIG. 1 to press the layers 12, 14 and 16 together. The pressure applied by the clamping members to the layers 12, 14 and 16 is less than the extruding pressure of the thermoplastic inner layer and preferably is approximately 20–50 p.s.i. to bond the thermosetting outer layers 14, 16 to the thermoplastic inner layer 12. The formed laminate is cured in accordance with the manufacturer's specifications for the thermosetting material used for the outer layers. Pressure on the laminate is maintained during cool-down until the temperature is at least 50° F. below the fusion temperature of the inner thermoplastic layer 12. The laminate is then allowed to cool to room temperature.

In this manner, the flat laminated prestressed panel 10 of FIG. 2 is formed which will retain its flat configuration. Since the thermoplastic and thermosetting layers have different degrees of expansion and contraction, the laminated panel 10 embodies fabrication stresses similar to those in prestressed concrete. Also, many of the reinforcing fibers 18 of the thermosetting layers 14, 16 enter the grooves in the outer faces of the inner thermoplastic layer 12 during formation of the laminate to enhance the strength thereof.

If desired, the flat prestressed panel 10 of FIG. 2 can be post-formed into a simple or complex curved shape by placing it between matched die members 24, 26 in the manner shown in FIG. 3. The die members 24, 26 are heated to the forming temperature of the thermoplastic inner layer 12 and the flat panel 10 is preheated to the forming temperature of the thermoplastic inner layer before the die members are closed on the panel to apply a suitable pressure thereon less than the extruding pressure of the thermoplastic material. The formed curved panel is then allowed to cool down to at least 50° F. below the forming temperature of the thermoplastic inner layer before the die members 24, 26 are opened or separated. It has been found that curved panels formed in accordance with this method will retain the curved configuration imparted to them by the die members, thereby allowing such curved panels to be used for various useful purposes such as automobile or aircraft body panels, structural panels or the like.

In the case of complex curved shapes, it may be necessary to use a specific type of thermosetting material for the outer layers 14, 16. It has been found that curved panels of complex curvature can be successfully formed when DOW 432 resin is used with a catalyst of CIBA-GEIGY XU-205 material. When bonding the thermoset layers to the inner thermoplastic layer, this resin is "hard B-staged" for approximately one-half hour at approximately 190° F. before cooling to room temperature to form the flat panel of FIG. 2. Thereafter, a panel of complex curved configuration can be formed in a die or the like in accordance with the method hereinbefore described. During the forming to the curved configuration, the temperature in the die during forming must be at least 325°–350° F. to allow the thermoplastic material to flow and cure.

I claim:
1. A prestressed thermoformed panel, comprising:
   an inner layer of thermoplastic material having grooves on the outer surfaces thereof; and
   outer layers of fiber reinforced thermosetting materials bonded to the outer surfaces of said inner layer;
   the grooves of said inner layer being of a size, pattern and orientation approximately the same as that of the fibers of said thermosetting materials, whereby at least some of said fibers are positioned in said groves to enhance the strength of the panel.

2. The panel of claim 1 wherein said thermosetting layers are formed of substantially the same materials and fiber size, pattern and orientation.

3. The panel of claim 1 wherein it is of a flat configuration.

4. The panel of claim 1 wherein it is of a curved configuration.

* * * * *